3,158,589
POLYMERIZATION OF PYRROLIDONE AND PIPERIDONE; PROCESS EMPLOYING HALIDES AND OXYHALIDES OF SULFUR AND PHOSPHORUS
Samuel A. Glickman, Easton, Edgar Shelley Miller, Bethlehem, and Saul R. Buc, Easton, Pa., assignors to General Aniline & Film Corporation, New York, N.Y., a corporation of Delaware
No Drawing. Filed Apr. 4, 1958, Ser. No. 726,343
9 Claims. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

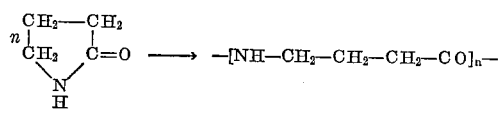

The recurring unit is one which might hypothetically arise in the condensation polymerization of 4-aminobutyric acid. However, early investigators, namely Gabriel (Berichte 32, 1266 (1899)) and Schotten (Berichte 21, 2240 (1880)), observed that 4-aminobutyric acid and 5-aminovaleric acid failed to undergo intermolecular condensation and yielded only the five and six membered lactams. The first disclosure of such polyamides was that of U.S.P. 2,638,463 (W. O. Ney, W. R. Nummy and C. E. Barnes, May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959 of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactams in the presence of a small amount of an acyl compound, as an activator for the alkaline polymerization catalyst; and preferably, carrying out the polymerization of a lactam while dispersed in an anhydrous hydrocarbon non-solvent therefore, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones and alkyl esters. The Ney and Crowther patent discloses the use of these acyl compounds as activators for the alkaline polymerization catalyst.

We have now found that the particular class of halides and oxyhalides of sulfur and phosphorus are capable of acting as promoters in the alkaline catalyzed polymerization of 5- and 6-membered lactams; e.g. of pyrrolidone and piperidone.

Specific compounds in the above class, which are useful as promoters are: sulfur monochloride, sulfur monobromide, sulfur dichloride, sulfuryl chloride, thionyl chloride, phosphorus trichloride, phosphorus tribromide, phosphorus oxychloride and phosphorus pentachloride.

The polyamides obtained via the employ of the above promoters with alkaline solutions of pyrrolidone and piperidone in these lactams, possess the general formulae:

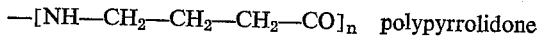

The general conditions and factors utilized for polymerizing 5- and 6-membered lactams, pursuant to the present invention, may be those mentioned in U.S. Patent No. 2,739,959, except for the presence of the promoters of the instant invention viz. halides and oxyhalides of sulfur and phosphorus, in place of the activators specified in that patent. In general, the method of effecting polymerization of 5- and 6-membered ring lactams, by the process of the present invention is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent (percentages based on pyrrolidone), and may range from 0.1 to 10.0 mole percent. In series of experiments, optimum yields were obtained with about 1.25 mole percent of alkali pyrrolidone. The role of the alkali pyrrolidone is that of a catalyst and serves as a source of pyrrolidone anions.

The amount of promoter employed in many instances may vary from 0.1 to 10.0 moles percent (percentage based on pyrrolidone). The concentration of promoter chosen, will depend on the conversion desired, and the molecular weight sought. The rate of the polymerization will depend, to a large extent, on the molar amount of promoter employed, the higher rates obtained by the use of greater amounts of promoter. The polymerizations may be initiated at temperatures from 25° C. to 65° C. and are accompanied by a mild exothermic reaction.

In a bulk or mass polymerization, the addition of the promoter is followed by a thickening of the solution and gradual solidification of the mixture. The toughness of the cake will, obviously depend on the extent of the conversion and will be dependent on the times involved and amounts of promoters used.

The polymerization employing the foregoing promoters may be conducted on a dispersion of pyrrolidone, and the alkali pyrrolidone in a nonsolvent for the pyrrolidone. Applicable non-solvents fall in the class of saturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone, but is subject to wide variation. The physical state of the resulting polymer obtained, via a dispersion polymerization may vary from a thick curd to a fine powder, depending on conversion desired, ratio of non-solvent and type as well as rate of agitation.

For the purposes of comparison, there are given below, as Examples A and B, illustrations of the prior art polymerization of highly purified pyrrolidone, from the same batch, and purified in the same manner as the pyrrolidone used in the examples appearing later in the specification of the process of the present invention:

*Example A*

A 500 cc. glass flask was charged with 100.0 grams (1.18 moles) of highly purified pyrrolidone. There is added 1.0 gram of potassium hydroxide flakes of 83% assay, the system immediately placed under a reduced pressure of 10 mm. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24 hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

*Example B*

This example is an illustration of an alternate polymerization of highly purified pyrrolidone, and closely follows Example 1, of U.S. Patent 2,739,959, which is also an illustration of prior art polymerization of pyrrolidone.

A 500 cc. glass flask, equipped for vacuum distillation, was charged with 120.0 grams of highly purified pyrrolidone. There is added 1.0 gram of potassium hydroxide flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24 hour period the mixture became turbid and a scant amount of solid was deposited. The contents was treated with 400 grams of distilled water, the solid filtered and thoroughly washed with water. The dried polymer weighed 0.5 gram, representing a conversion of 0.5%. The material was of low molecular weight, as indicated by the relative viscosity of a 1% solution in meta cresol.

The details of the present invention will be apparent to those skilled in the art, from the following specific examples, of preferred methods of practicing the same:

*Example I*

A 1000 cc. glass flask was charged with 200 grams (2.36 moles) of highly purified pyrrolidone. There was then added 5.6 grams of potassium hydroxide flakes of 83% assay, and the mixture immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone, and, at the same time effecting the removal of water. After one-half hour at reflux, there was obtained a clear colorless solution of potassio pyrrolidone in pyrrolidone. To this solution at 50° C. was added 1.65 grams (0.012 mole) of phosphorus trichloride. The molar concentration of the halide is 0.5 mole percent based on the pyrrolidone. The temperature rose to 56° C. in several minutes and thickened considerably. In the course of 20 minutes it became a dry gel and in one and one-half hours was a hard white mass. The mixture was allowed to stand for 18 hours to the exclusion of moisture and carbon dioxide. The solid was dissolved with stirring in 800 cc. of 6 N hydrochloric acid. The viscous solution was neutralized with aqueous ammonia and the resulting white solid filtered, washed thoroughly and dried in a vacuum oven at 80° C. There was obtained 112 grams of white polypyrrolidone, M.P. 251–253° C., in a conversion of 56%. The relative viscosity of a 1% solution in m-cresol was 1.76.

*Example II*

A 500 cc. flask was charged with 120 grams of highly purified pyrrolidone. There was added 2.6 grams of potassium hydroxide flakes of 83% assay and the system immediately placed under a reduced pressure of 10 mm. In rapid fashion, at total take-off, there was distilled 20 grams of pyrrolidone at 125° C. to ensure the removal of water. The remaining 100 grams (1.18 moles) of a pyrrolidone solution of potassium pyrrolidone was cooled to 30° C. To this solution was added 0.62 gram (0.004 mole) of phosphorus oxychloride, representing a molar concentration of 0.33% based on pyrrolidone. The temperature rose to 37° C. in several minutes and in the course of 18 hours had become a hard white mass. The material was permitted to stand for a total of 48 hours to the exclusion of moisture and carbon dioxide. The solid was dissolved with stirring in 300 grams of 90% formic acid. The viscous solution was poured onto 2000 grams of ice and water to precipitate the polymer. The white solid was filtered, washed thoroughly and dried in a vacuum oven at 80° C. There was obtained 16.7 grams for a conversion of 16.7%. The relative viscosity of a 1% solution in m-cresol was 3.739.

*Example III*

A 500 cc. flask was charged with 120 grams of highly purified pyrrolidone. There was added 3.4 grams of potassium hydroxide flakes of 83% assay and the system immediately placed under a reduced pressure of 10 mm. In rapid fashion, at total take-off, there was distilled 20 grams of pyrrolidone at 125° C. to ensure the removal of water. The remaining 100 g. (1.18 moles) of a pyrrolidone solution of potassium pyrrolidone was cooled to 30° C. To this solution was added 1.08 grams (0.009 mole) of thionyl chloride, representing a molar concentration of .75% based on pyrrolidone. The temperature rose gradually to 56° C. in the course of one-half hour and at the same time the contents progressed through stages to form a hard mass. The material was allowed to stand for 24 hours to the exclusion of moisture and carbon dioxide. The solid was dissolved with stirring in 400 grams of 90% formic acid and the resulting viscous solution diluted with 2000 grams of ice and water to precipitate the white polyamide. The solid was thoroughly washed with water and dried in a vacuum oven at 80° C. There was obtained 64.6 grams of polyamide for a conversion of 64.6%. The relative viscosity of a 1% solution in m-cresol of the above polypyrrolidone was 4.28.

*Example IV*

A solution of potassio pyrrolidone in pyrrolidone, weighing 50 grams (.6 mole), was prepared by the procedure given in Example III from 60 grams of pyrrolidone and 1.64 grams of potassium hydroxide flakes of 83% assay. To this solution at 28° C. was added 0.61 gram (.0045 mole) of sulfur monochloride, representing a molar concentration of 0.75 mole percent based on pyrrolidone. The temperature rose to 37° C. in the course of one-half hour and the solution gradually increased in viscosity to form a solid gel. In 3 hours the contents was a hard solid white mass. The material was allowed to stand for 24 hours to the exclusion of moisture and carbon dioxide. Then added 200 grams of 90% formic acid to dissolve the polyamide mass. The resulting viscous solution was filtered to remove sulfur and the filtrate diluted with 1500 ml. of water to precipitate the polypyrrolidone formed. The solid was washed and vacuum oven dried at 80° C. to give 25.7 g. of polyamide for a conversion of 51%. The relative viscosity of a 1% solution in m-cresol was 5.10.

*Example V*

The following example illustrates the employ of heptane as the medium for the non-solvent suspension polymerization of pyrrolidone using phosphorus trichloride as the polymerization promoter.

A 500 cc. flask was charged with 120 grams of highly purified pyrrolidone. There was added 3.0 grams of potassium hydroxide flakes of 83% assay and the system immediately placed under a reduced pressure of 10 mm. In rapid fashion, at total take-off, there was distilled 20 grams of pyrrolidone to ensure the removal of water. The remaining 100 grams (1.18 moles) of pyrrolidone containing potassio pyrrolidone was cooled to 30° C.

The solution from above was added to 300 ml. of anhydrous heptene in a suitably equipped reaction vessel. To the rapidly agitated mixture at 30° C. was added 0.55 gram (0.004 mole) of phosphorus trichloride. The temperature rose to 36° C. in five minutes and the nature of the suspended liquid gradually formed a white fluid phase. The suspended material thickened to a curd-like mass and at the end of 24 hours of high speed stirring was a finely divided white powdery solid. The solid was filtered, suspended in methanol to remove excess pyrrolidone, washed thoroughly to remove alkali and dried at 80° C. in a vacuum oven. The resulting white polyamide weighed 60 grams to give a conversion of 60%. The relative viscosity of a 1% solution in m-cresol was 5.16.

*Example VI*

Charge a 500 cc. flask with 99.0 grams (1.0 mole) of highly purified piperidone. Add 3.0 grams of potassium hydroxide of 83% assay; place the system immediately under a reduced pressure of 5 mm. and rapidly heat to the reflux point (120–125° C.). Condense the vapors in a vertical reflux condenser maintained at a jacket temperature of 75° C., thus permitting the return of piperidone and, at the same time, effecting the removal of water. After one hour at the reflux point, cool the reaction mixture in the still pot to 50° C. and treat the colorless solution with 0.69 gram (0.005 mole) of phosphorus trichloride, corresponding to 0.5 mole percent initiation promoter. The solution thickens gradually and becomes a solid mass in 24 hours. Moisture and carbon dioxide are excluded in this interval. The solid is dissolved with stirring in 400 grams of 90% formic acid. The viscous solution is poured onto 2000 grams of ice and water and the precipitated solid filtered, thoroughly washed and finally dried in a vacuum oven at 80° C. The polyamide thus obtained has the structure of polypiperidone.

While a N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines.

As samples of specific reagents, which may be employed to terminate the polymer chains, otherwise than in a pyrrolidonyl or piperidonyl radical, may be mentioned water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed through scisson of the terminal pyrrolidone ring, or one of the polyamide linkages, particularly the linkage between terminal pyrrolidonyl linkage and the carbonyl grouping linked thereto. Termination of the polymer chain by means of an ester, such as

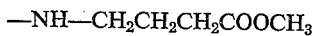
—NH—CH$_2$CH$_2$CH$_2$COOCH$_3$ may be accomplished by treatment of the polymer intermediate, with methanol. In a similar fashion, treatment of the polymer obtained in the hexane suspension polymerization with an amine, such as aniline, yields an amide terminated function, of the type

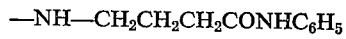
—NH—CH$_2$CH$_2$CH$_2$CONHC$_6$H$_5$

Hydrolysis of the terminal ring may be accomplished by treating the alkaline containing white solid, obtained in the polymerization, with water at 75–80° C. for one hour. The resulting product is terminated by a

—NH—CH$_2$CH$_2$CH$_2$COOK group. Conversion to the free acid, and, consequently to the other metal and ammonium salts, is accomplished by acidification and respective action of alkalizing agents.

The products of the present invention are, as indicated, polyamides of the nylon-4 type from pyrrolidone, or nylon-5 from piperidone; and, as such, are useful in the arts as in many applications of nylon. In particular, the products of the present invention, particularly, those of relatively high molecular weight, e.g., products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystalline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperdone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 position such as 3-methyl-2-pyrrolidone, 4 - methyl - 2 - pyrrolidone, 4-ethyl-2-pyrrolidone, 3,3-dimethyl - 2 - pyrrolidone, 4,4-dimethyl-2-pyrrolidone, 3-methyl-2-piperidone, and 3-ethyl-2-piperidone. The alkyl substituted pyrrolidones and piperidones may be represented by the general formula:

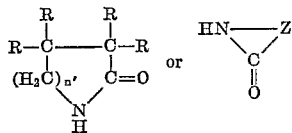

wherein Z represents

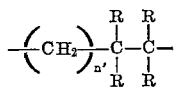

where $n'$ is one of the integers 1 and 2 and R's represent a member of the group consisting of H and lower alkyl groups of 1 to 4 carbon atoms. The polymeric unit of the polymers produced on polymerizing them in accordance with the present invention may thus be represented by the general formula:

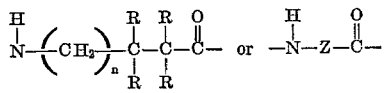

We claim:
1. In the process of polymerizing lactams of the formula

wherein Z represents

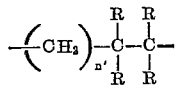

where $n'$ is an integer from 1 to 2 and R represents a member of the group consisting of H and lower alkyl groups of 1 to 4 carbon atoms under essentially anhydrous conditions in the presence of a minor amount up to about 10 mole percent based on said lactam of an alkali metal lactam as the polymerizaion catalyst; the improvement comprising carrying out said polymerization in the presence of a minor amount up to about 10 mole percent based on said lactam, but less than the amount of said catalyst of a compound selected from the group consisting of halides and oxyhalides of sulfur and phosphorous.

2. In the process of polymerizing pyrrolidone under essentially anhydrous conditions in the presence of a minor amount up to about 10 mole percent based on said pyrrolidone of an alkali metal pyrrolidone as the polymerization catalyst; the improvement comprising carrying out said polymerization in the presence of a minor amount up to about 10 mole percent based on said pyrrolidone, but less than the amount of said catalyst of a compound selected from the group consisting of halides and oxyhalides of sulfur and phosphorous.

3. In the process of polymerizing piperidone under essentially anhydrous conditions in the presence of a minor amountup to about 10 mole percent based on said piperidone of an alkali metal piperidone as the polymerization catalyst; the improvement which comprises carrying out said polymerization in the presence of a minor amount up to about 10 mole percent based on said piperidone, but less than the amount of said catalyst of a compound selected from the group consisting of halides and oxyhalides of sulfur and phosphorous.

4. A process as defined in claim 2 wherein the compound selected from the group consisting of halides and oxyhalides of sulfur and phosphorous specified is phosphorous trichloride.

5. A process as defined in claim 2 wherein the compound selected from the group consisting of halides and oxyhalides of sulfur and phosphorous specified is phosphorous oxychloride.

6. A process as defined in claim 2 wherein the compound selected from the group consisting of halides and oxyhalides of sulfur and phosphorous specified is thionyl chloride.

7. A process as defined in claim 2 wherein the compound selected from the group consisting of halides and oxyhalides of sulfur and phosphorous specified is sulfurmonochloride.

8. A process as defined in claim 3 wherein the compound selected from the group consisting of halides and oxyhalides of sulfur and phosphorous is phosphorous trichloride.

9. A process for polymerizing pyrrolidone which comprises forming under essentially anhydrous conditions, a mixture containing monomeric pyrrolidone, a catalytic amount of alkali metal pyrrolidone as the polymerization catalyst, and as a polymerization activator in an amount less than the amount of catalyst employed, a member selected from the group consisting of phosphorus trichloride, phosphorus pentachloride and phosphorus oxychloride, and allowing the pyrrolidone in the mixture to polymerize to a solid polymer.

References Cited in the file of this patent

Noble: Doctoral Dissertation Series, Publ. No. 22,623 (1956), Ph. D. Thesis at the University of Colorado, pages 40–48.